(12) United States Patent
Power et al.

(10) Patent No.: US 8,547,634 B2
(45) Date of Patent: Oct. 1, 2013

(54) OPTICAL ARRANGEMENT FOR PHOTOMANIPULATION

(75) Inventors: Christopher Power, Jena (DE); Helmut Lippert, Jena (DE); Benno Radt, Jena (DE); Christian Dietrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 605 days.

(21) Appl. No.: 12/680,165

(22) PCT Filed: Sep. 16, 2008

(86) PCT No.: PCT/EP2008/007690
§ 371 (c)(1),
(2), (4) Date: Mar. 25, 2010

(87) PCT Pub. No.: WO2009/043473
PCT Pub. Date: Apr. 9, 2009

(65) Prior Publication Data
US 2010/0193673 A1 Aug. 5, 2010

(30) Foreign Application Priority Data
Sep. 28, 2007 (DE) .......................... 10 2007 047 464

(51) Int. Cl.
*G02B 21/06* (2006.01)
(52) U.S. Cl.
USPC ......................................................... 359/385
(58) Field of Classification Search
USPC ......................................... 359/385; 250/251
See application file for complete search history.

(56) References Cited

U.S. PATENT DOCUMENTS

| 4,386,274 A * | 5/1983 | Altshuler ...................... 250/251 |
| 6,020,591 A | 2/2000 | Harter et al. |
| 2010/0134881 A1 * | 6/2010 | Lippert et al. ................ 359/381 |

FOREIGN PATENT DOCUMENTS

| EP | 1 777 571 | 4/2007 |
| EP | 1 912 089 | 4/2008 |

OTHER PUBLICATIONS

Jan Huisken et al., "Even fluorescence excitation by multidirectional selective plane illumination microscopy (mSPIM)", Optics Letters, 32(17), Sep. 1, 2007, pp. 2608-2610.*
Jan Huisken et al.; Even fluorescence excitation by multidirectional selective plane illumination microscopy (mSPIM); Optics Letters; Sep. 1, 2007; vol. 32; No. 17; pp. 2608-2610.
Tobias Brueninger et al.; "Lateral modulation boosts image quality in single plane illumination fluorescence microscopy"; Optics Letters; Jul. 1, 2007; vol. 32; No. 13; pp. 1938-1940.

(Continued)

*Primary Examiner* — Frank Font
(74) *Attorney, Agent, or Firm* — Frommer Lawrence & Haug LLP

(57) ABSTRACT

The invention is directed to an optical arrangement for photomanipulation of a sample comprising a sample holder for receiving the sample, an illumination device comprising an illumination light source and an illumination beam path for illuminating the sample with a light sheet. It further comprises a detection device for detecting light that is radiated from the sample and imaging optics which image the sample on the detection device by means of an imaging objective in an imaging beam path, wherein the light sheet is substantially planar in the focus of the imaging objective, and wherein the imaging objective has an optical axis which intersects the plane of the light sheet at an angle different from zero. Further, the arrangement also has means for photomanipulation of the sample.

17 Claims, 2 Drawing Sheets

(56) References Cited

OTHER PUBLICATIONS

Greger K et al: "Basic building units and properties of a fluorescence single plane illumination microscope,"Review of Scientific Instruments, AIP, Melville, NY, U.S., vol. 78, No. 2, Feb. 28, 2007, pp. 23 705—(1)—23 705—(7), XP0121 03 772, ISSN: 0034-6748, 001: 001:10.1063 / 1.2428277.

EP Examination Report for Application No. 08 802 224.9 dated May 11, 2011.

\* cited by examiner

OPTICAL ARRANGEMENT FOR PHOTOMANIPULATION

The present application claims priority from PCT Patent Application No. PCT/EP2008/007690 filed on Sep. 16, 2008, which claims priority from German Patent Application No. 10 2007 047 464.6 filed on Sep. 28, 2007, the disclosure of which is incorporated herein by reference in its entirety.

BACKGROUND OF THE INVENTION

1. Field of the Invention

The invention is directed to an optical arrangement for photomanipulation of a sample comprising a sample holder for receiving the sample, an illumination device comprising an illumination light source and an illumination beam path for illuminating the sample with a light sheet, a detection device for detecting light that is radiated from the sample, imaging optics which image the sample at least partially on the detection device by means of an imaging objective in an imaging beam path, wherein the light sheet is substantially planar in the focus of the imaging objective, and wherein the imaging objective has an optical axis which intersects the plane of the light sheet at an angle different from zero, preferably perpendicularly, a control unit, and means for photomanipulation of the sample.

The optical arrangement according to the invention can be applied for observation of the sample particularly in connection with single plane illumination microscopy (SPIM), also known as selective plane illumination microscopy. Whereas in confocal laser scanning microscopy the sample is scanned point by point in a plurality of planes at different depths and three-dimensional image information about the sample is obtained from this, the SPIM technique is based on widefield microscopy and makes it possible to generate three-dimensional images of samples based on optical sections through different planes of the sample.

The advantages of SPIM include faster acquisition of images, reduced bleaching out of biological samples, and an expanded depth of penetration of the focus in the sample.

2. Description of Related Art

Basically, in the SPIM technique fluorophores which are contained in the sample or introduced into the sample are excited by laser light which is shaped as a light sheet or which is guided over the sample in such a way that the shape of a light sheet results in effect, i.e., over the period of observation. Each light sheet illuminates a plane in the depth of the sample, and an image of the sample in this plane is obtained by means of this illumination. It is important that elements in the light sheet plane are projected on the detector plane or that the light sheet plane and detector plane are conjugate to one another. In conventional microscope constructions in which the detector plane extends perpendicular to the optical axis of the detection beam path, the direction in which light is detected is perpendicular, or at least virtually perpendicular, to the plane of illumination.

SPIM technology is described, for example, in Stelzer et al., *Optics Letter* 31, 1477 (2006), Stelzer et al., *Science* 305, 1007 (2004), DE 102 57 423 A1, and WO 2004/0530558 A1.

Aside from the observation of samples, the manipulation of biological, living or non-living matter and inorganic matter is also highly important in microscopy. For example, many samples can be photoactivated, photodeactivated, or heated. Manipulation also includes the processing of samples, i.e., for example, the polymerization of samples or, for example, the separation of areas of the sample from the rest of the sample by means of laser scalpels. Manipulation methods based on the interaction of light with the sample to be manipulated, e.g., laser ablation, bleaching, photoactivation, are particularly suitable when mechanical contact with the sample is to be avoided. Areas can be manipulated very precisely at microscopic resolution with appropriately designed optics.

For samples having a substantially flat shape such as, e.g., adherent cells or interfaces, manipulation can also be carried out very precisely with optics which do not offer high resolution axially.

However, for spatially extensive, three-dimensional samples, spatially precise manipulation is very difficult and can only be accomplished with complicated setups which are also often based on nonlinear interactions between the manipulation light beam and the sample.

Some of the standard techniques of photomanipulation-fluorescence loss in photobleaching (FLIP), photoactivation (PA GFP), reversible photoactivation (Dronpa), photoconversion (kaede), fluorescence localization after photobleaching (FLAP), microdissection, uncaging, to name only a few examples—have already been known and established in microscopy for decades. Usually, a laser beam of suitable power and wavelength is focused via an observation objective and directed to the sample. With corresponding power modulation, the laser beam can also be used for excitation for applications in fluorescence microscopy. Manipulation techniques, for example, the LASEC technique, are also used in ophthalmology.

However, there is a limited availability of devices which can carry out a specific manipulation in three-dimensional samples and which allow three-dimensional imaging of the sample at the same time. Confocal laser scanning microscopes are usually used for this purpose. However, the manipulation is not confocal with respect to excitation, even when this is true for the imaging. Therefore, the sample area that is illuminated is appreciably larger than is actually necessary. Only scanning microscopes using nonlinear interactions, e.g., two-photon excitation, offer a solution for this purpose. In microscopes of this kind, a confocal manipulation area which can be positioned in the sample with some accuracy is also formed on the excitation side. However, solutions of this type involve very complicated technology; for example, they require the use of short-pulse lasers and are limited with respect to choice of wavelength.

The manipulation of samples using microscopes is described, for example, in DE 102 33 549.

SUMMARY OF THE INVENTION

Therefore, it is the object of the invention to develop an arrangement by which manipulation can be carried out in limited areas of the sample in a simple manner substantially in the focus plane of the microscope. In particular, a confocal manipulation of samples should be possible also without the use of multiphoton effects. The arrangement should advantageously also be capable of three-dimensional, isotropic imaging of the sample before, after, or during the manipulation.

This object is met in an optical arrangement of the type described in the beginning in that the means for photomanipulation comprise first manipulation optics by means of which light from a first manipulation light source is coupled into the illumination beam path for shaping a substantially planar manipulation light sheet.

Accordingly, for photomanipulation the sample is not illuminated in the conventional manner with light suited to SPIM examination which is shaped to form a light sheet, but rather with light from a special manipulation light source. However, the light of this manipulation light source is coupled into the same illumination beam path and is accordingly shaped to form a light sheet in the same way as is used for observation in the SPIM method. In so doing, the light can also be shaped to form a light sheet in effect, i.e., over the period of manipulation, by guiding the laser light over the sample. The coupling in of the light is controlled by a control unit which controls corresponding input-coupling elements such as diaphragms, semitransparent mirrors, and spatial light modulators, e.g., galvanometer mirrors. The manipulation light source can be a laser which emits light of a wavelength or wavelength range different from the actual illumination light. Depending on the type of experiment, however, the illumination light source itself can also be used as a manipulation light source. In this case, the manipulation optics and input-coupling elements can be dispensed with. It is also conceivable to combine a plurality of lasers in a light source module, in which case one or more of the light sources can be selected and coupled into the illumination beam path depending on whether the illumination method or manipulation method is selected.

In addition to using selected manipulation light sources, the first manipulation optics can also comprise means for structuring the light sheet. The light sheet itself has a length and width which extend substantially perpendicular to the optical axis of the microscope objective in coordinates X and Y and which are adapted to the sample field to be examined and has a thickness in the range of a few micrometers extending in direction of the optical axis of the imaging objective. This light sheet can be structured spatially, for example, by means of a slit diaphragm having one or more slits for spatial structuring. This slit diaphragm is inserted in the illumination beam path in a plane conjugate to the object plane of the detection objective; the light sheet is then modulated in a lattice shape in the image plane. For example, if a fluorescing sample is located in the area of the light sheet, the fluorescence is correspondingly modulated over the image field. A grating can also be used instead of a slit diaphragm.

The means for structuring the light sheet preferably also comprise means for the temporal modulation thereof. For example, the illumination intensity can be temporally modulated. Also, the polarization of the light can be influenced.

When the light sheet is shaped in effect by guiding laser light over the sample during the observation period, means for temporal modulation of the illumination light can also be used in a similar manner to achieve a spatial structuring.

In another construction of the invention, the means for structuring also have, alternatively or in addition, means for generating a plurality of overlapping light sheets.

The structuring of the light sheets through gratings, diaphragms or the like makes it possible, for example, to initiate photobleaching processes restricted to the bright areas and then to observe FRAP processes because no bleaching processes were initiated in the dark areas.

The advantage in using the arrangement described above is that manipulation remains restricted to the focus plane; outside the focus plane, the sample is not impaired. Another advantage of the described arrangement consists in that the means for photomanipulation can be integrated in existing setups for SPIM analyses in a simple manner, for example, in a modular construction.

However, in the focus plane the sample is manipulated over the extent of an entire stripe or line; it is not possible to limit to a smaller area. Nevertheless, the area to be manipulated in the sample, or the manipulated area in the sample, can be further limited when the means for photomanipulation comprise second manipulation optics by means of which light from a second manipulation light source is coupled into the imaging beam path and is deflected to the sample by the imaging objective.

Accordingly, in this embodiment of the invention the sample is illuminated not only by the manipulation light sheet, but additionally via the imaging objective from a direction substantially perpendicular to the plane of the light sheet.

Besides the first manipulation light source, the second manipulation light source can also be constructed as a laser light source having at least one laser. In this case also, of course, a plurality of lasers can again be combined in one module so that one or more lasers can be selected as desired. The first manipulation light source and second manipulation light source preferably radiate light of different wavelengths or different wavelength ranges, but can also emit light of the same wavelength or wavelength range depending on the required application.

In particular, the second manipulation optics can be designed as a laser scanning microscope. There are also modular microscope units of this type, for example, the LSM-DUO-scan by Carl Zeiss. Further, it is possible to supply both manipulation optics with a single manipulation light source by correspondingly splitting the beam of the light source. In this case, the first manipulation light source and second manipulation light source are identical. Therefore, in the most advantageous instance, the illumination source can serve for illumination and also for manipulation via one of the two manipulation beam paths or by both manipulation beam paths.

Therefore, when using two manipulation optics, as was just described, whose beam paths intersect substantially perpendicularly in the sample, it is possible to limit the manipulation to a small area of the sample, namely, to the area in which the light beams of the manipulation optics intersect, without a great expenditure on conversion and without high costs. In this way, a confocal sample manipulation is possible without requiring expensive arrangements using multiphoton effects. However, when both manipulation light beams are used, it is also easy to make use of multiphoton effects in the examination.

A considerable advantage of SPIM technology is the possibility of generating spatial images of the sample. Therefore, the sample and/or the sample holder are/is also advisably supported so as to be movable, preferably rotatable and displaceable, in the present arrangement. In this way, all areas of the sample can be made accessible for manipulation, particularly also for a spatially strictly localized manipulation. The control unit is advisably designed for controlling both manipulation optics. Further, the arrangement advisably has an evaluating unit which converts the light that is preferably detected pixel by pixel on a flat CCD detector into data, i.e., digital signals, and also evaluates it. The signal conversion is often also carried out in the detection device itself. The control unit controls the movement of the sample and/or sample holder, preferably depending on the evaluation of the data. However, when controlled in a corresponding manner, a control according to a given program in which the sample is completely illuminated, for example, and the same manipulation procedures are recurrently carried out is also possible.

In particular, the optical arrangement for photomanipulation according to the invention can be used with one or more manipulation methods FRAP, iFRAP, FLIP, FLAP, photoconversion, photoactivation, photoinactivation, microdissection, polymerization, ablation, melting, heating, and manipulation of excitation characteristics and emission characteristics of dyes. The arrangement according to the invention can also readily be used for spatially localized manipulation of a spatially extensive sample.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
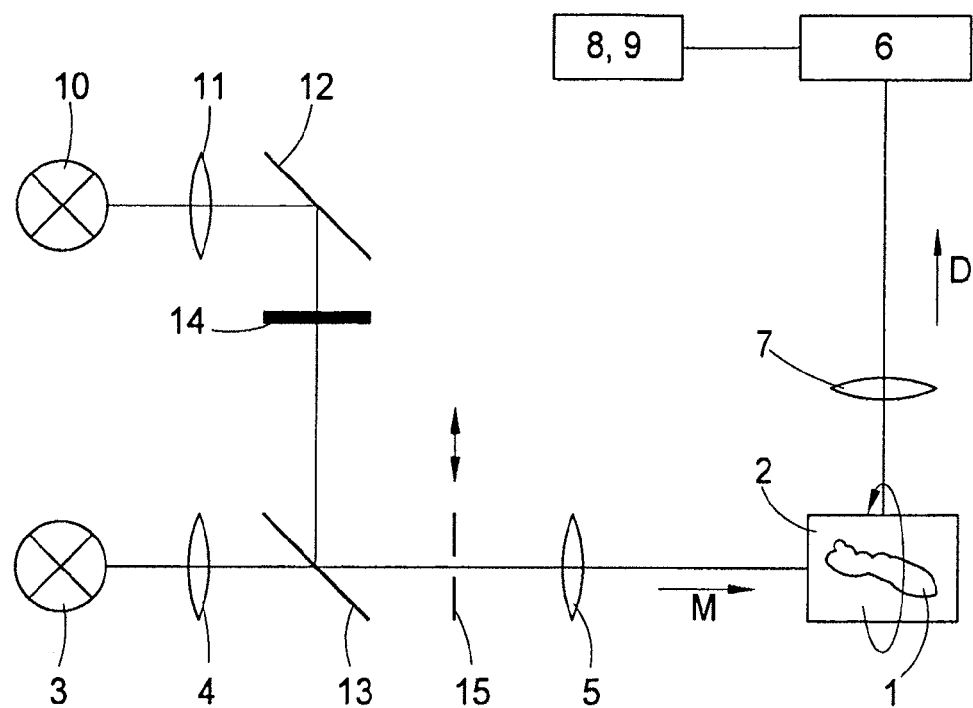
FIG. 1 an optical arrangement for photomanipulation with a normal illumination light source and a manipulation light source.

FIG. 1 shows an optical arrangement for photomanipulation of a sample 1. The sample 1 is received by a sample holder 2. The sample 1 can be embedded, for example, in a gel cylinder of agarose which is fastened in the sample holder 2. The sample holder 2 is preferably supported so as to be rotatable as is indicated by the arrow. Further, the sample holder 2 is preferably supported to as to be displaceable, i.e., movable in all three spatial directions, so that all areas of the sample 1 can be illuminated and detected. Alternatively, the sample 1 can also be supported so as to be movable and the sample holder 2 can be designed to be stationary so that the movements of the sample 1 and the sample holder 2 are decoupled. The arrangement has an illumination device with an illumination light source 3 and an illumination beam path characterized by two lenses 4 and 5. The sample 1 can be illuminated by a light sheet according to the SPIM technique by means of the illumination device. In the present case, the light is preferably directed onto the sample 1 parallel to the axis of rotation of the sample holder 2. Further, the arrangement has a detection device for detecting light which is radiating from the sample 1. An important component of the detection device is a line-shaped detector or two-dimensional detector which is designed as a CCD camera 6 in the present example. Other detectors, for example, CMOS-based detectors, can also be used insofar as the registered intensity signals can be readily converted into digital information. The sample 1, or the light coming from the sample 1, is imaged at least partially on the detection device, i.e., the CCD camera 6, through imaging optics with an imaging objective 7 located in an imaging beam path, The light sheet for illumination is substantially planar in the focus of the imaging objective 7. Further, the optical axis of the imaging objective 7 intersects the plane of the light sheet at an angle different from zero, preferably perpendicularly, as is shown in FIG. 1. Further, the optical arrangement has a control unit 8 which is combined with an optional evaluating unit 9 in the example. In the evaluating unit 9, the detected light is converted into data and evaluated. The direction in which light is detected is identified by the arrow D between the imaging objective 7 and CCD camera 6.

Further, the optical arrangement has means for photomanipulation of the sample 1. These means for photomanipulation comprise first manipulation optics by means of which light of a first manipulation light source 10 is coupled into the illumination beam path to form a substantially planar manipulation light sheet. The direction in which manipulation light is directed onto the sample is identified by arrow M between the lens 5 and sample holder 2. In the present case, in addition to a lens 11 which, like lenses 4 and 5, can, of course, represent arrangements having a plurality of lenses, the manipulation optics also comprise a deflection mirror 12 and a corresponding input-coupling element 13 for coupling into the illumination beam path. The input-coupling element 13 can be designed, for example, as a semitransparent mirror or as a polarization beamsplitter or as a galvanometer mirror. Further, a diaphragm 14 constructed as a shutter, for example, an iris stop, which passes or blocks light depending on how it is controlled by the control unit 8 can also be provided. The input-coupling element 13 and deflection mirror 12 can also be controlled by the control unit 8 if necessary, for example, when the input-coupling element 13 is designed as a galvanometer mirror or when the deflection mirror 12, instead of the diaphragm 14, is rotated to direct the light into a light trap and block it. It is important only that means are provided for coupling into the illumination beam path along with the possibility for controlling this. For the sake of clarity, these connections of the control unit 8 to the controlled elements of the optical arrangements are not shown. The first manipulation light source 10 can be constructed, for example, as a laser light source. It can also comprise a plurality of lasers of different wavelengths which can be switched individually or jointly.

Further, the arrangement also has means for structuring the light sheet. In the example shown in the drawing, the means for structuring the light sheet comprise a slit diaphragm 15 which can be inserted into the beam path and has one or more slits for spatial structuring of the light sheet.

Figure 2:
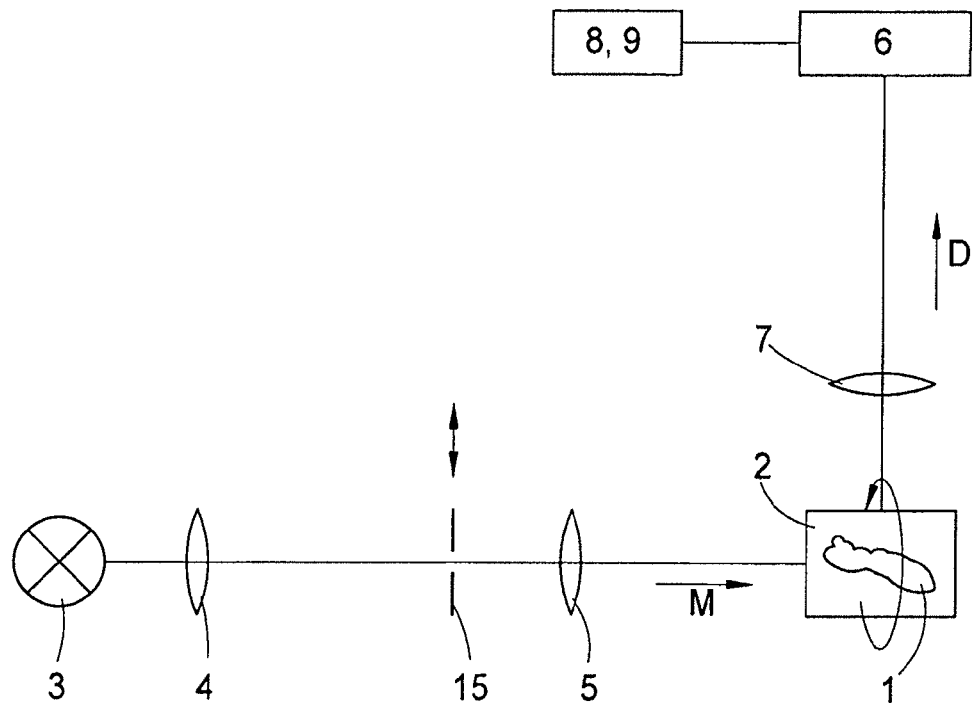
FIG. 2 a similar optical arrangement in which the illumination light source is used as a manipulation light source.

While the arrangement shown in FIG. 1 makes it possible to observe the sample and manipulate the sample alternately or, if required, also simultaneously, the arrangement shown in FIG. 2 which comprises substantially the same elements as the arrangement shown in FIG. 1 is designed in a simpler manner. In this case, the illumination light source 3 is provided as first manipulation light source 10. It depends on the respective application, i.e., on the utilized wavelengths or wavelength ranges in which the first manipulation light source 10 radiates light, whether the sample 1 can also be observed in a conventional manner with this light or whether only manipulation is possible with the arrangement. Here again, means are provided for structuring the light sheet. Further, in addition to a slit diaphragm 15, these means can comprise means for temporal modulation of the light sheet, for example, a control of the intensity or wavelength or also means for generating a plurality of light sheets which overlap one another.

Figure 3:
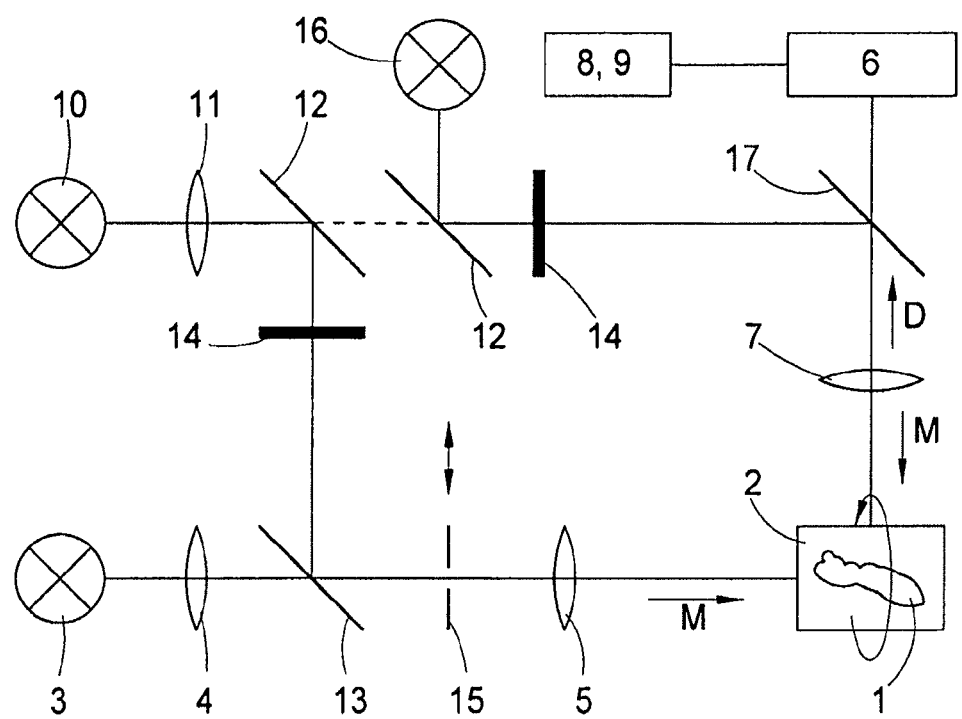
FIG. 3 the optical arrangement from FIG. 1, but with additional, second manipulation optics and two manipulation light sources.

FIG. 3 shows an arrangement similar to that in FIG. 1, but in this instance the means for the photomanipulation of the sample 1 have second manipulation optics in addition. Light of a second manipulation light source 16 is coupled into the imaging beam path and is directed to the sample 1 via the imaging objective 7. In this case, also, a deflection mirror 12 and a diaphragm 14 are provided for coupling in, while a beamsplitter 17 is provided for finally coupling the manipulation light into the imaging beam path, but passes light coming from the sample 1 to the CCD camera 6 in the detection direction. The second manipulation light source 16 can also be designed as a laser light source comprising at least one laser. The first manipulation light source and the second manipulation light source 16 can also radiate light of different wavelengths or wavelength ranges. Further, the second manipulation optics can be designed as a laser scanning microscope. This allows for the confocal illumination of the sample via the imaging beam path. When the deflection mirrors 12 are constructed as semitransparent mirrors rather than fully reflecting mirrors, light of the first manipulation light source 10 can also be coupled into the imaging beam path as is indicated by the dashed line. When the input-coupling element 13 is designed in a corresponding manner, light from the illumination source 3 can even be coupled into the imaging beam path and accordingly enables normal observation in incident illumination. Further, it is also possible to combine the second manipulation optics, as is shown in FIG. 3, with an arrangement according to FIG. 2.

Figure 4:
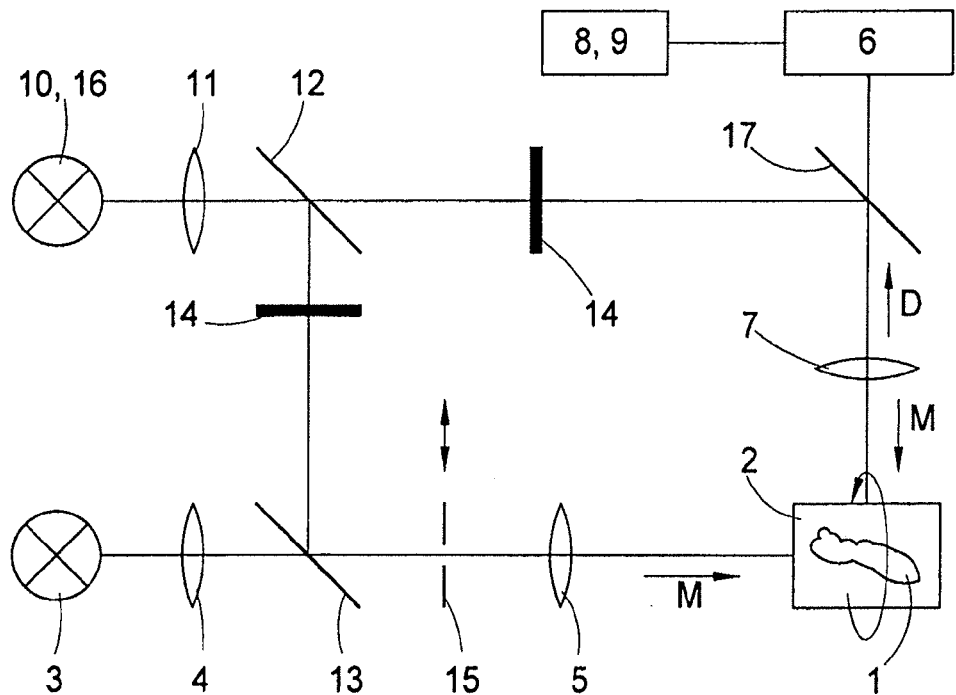
FIG. 4 the optical arrangement from FIG. 1, but with a second manipulation beam path and a shared manipulation light source.

Another variant is shown in FIG. 4, where the first manipulation light source 10 and second manipulation light source 16 are identical. But in this case another input-coupling element 13 is used instead of a deflection mirror 12. This input-coupling element 13 can be constructed, for example, as a beamsplitter so that both manipulation beam paths are supplied with light simultaneously, or as a switchable mirror which supplies one of the two beam paths alternately or on demand. As in the arrangement shown in FIG. 3, the illumination beam path with the illumination light source 3 can also be dispensed with, as the case may be, when illumination is unnecessary and the arrangement is to be restricted to manipulation alone. Alternatively, all light sources can also be combined in a single light source or at least combined in a light source module so as to further simplify the construction.

The arrangements shown herein make it possible to carry out photomanipulations in a limited area of the sample in a more economical manner with respect to construction and costs compared to other arrangements for spatially limited photomanipulation. In the case of the arrangement having manipulation optics in which the manipulation light is shaped to form a light sheet, the area of the sample 1 that is manipulated remains limited to the focus plane of the imaging objective 7. However, the area is still relatively large and inflexible because only entire lines or—when the light sheet is spatially structured—stripes can be manipulated.

With the arrangements shown in FIGS. 3 and 4, in which two manipulation optics and two manipulation beam paths are provided, areas in the sample which are highly spatially localized can also be manipulated without having to resort, e.g., to laborious multiphoton effects. With a corresponding selection of samples and manipulation technique, it is possible to limit the manipulation area in the sample to the area that is acquired in the overlapping of the light of both manipulation beam paths.

For example, samples can be dyed with dyes whose response is nonlinear with respect to the power densities that are radiated in. For example, a dye can be used whose response reacts quadratically with respect to the power density that is radiated in. Double the power density would quadruple the intensity of the signal. When both manipulation optics radiate on the sample with the same power density, an observer will see the quadrupled signal intensity in the area of the sample 1 where the beams intersect and only the single intensity in the rest of the areas. Accordingly, selection does not take place with multiphoton effects but rather through the addition of power densities. Of course, a combination with multiphoton techniques is also possible.

In another application example, a sample exhibits no response at all below a threshold value for the power density, but only when excited above this threshold. If the power density of the light of the two manipulation light sources is less than the threshold value when impinging on the sample but lies above the threshold when summed, a locally very narrowly limited area can also be selected in this way. When the sample has an absolute melting point in the area of the summed power densities of the manipulation light sources, the sample 1 can be broken up at this point, e.g., by the overlapping of the two beams. This can be used, for example, for microdissection. The light source can be the same in both of the cases just described.

Of course, different light sources can also be used. When a sample which is tagged with Dronpa 3 dyes is irradiated, neither irradiation with light of a wavelength of 405 nm, nor irradiation with light of a wavelength of 488 nm will excite emissions, for example. Bright emissions will only occur when both excitation wavelengths are combined simultaneously. However, these emissions occur in the sample 1 only in the region in which the two beams overlap or intersect, i.e., in a spatially very limited area, even when the manipulation optics considered individually illuminate a larger area.

Further, the optical arrangement can be applied in the examples described above also in many other manipulation methods, particularly those which analyze fluorescence, e.g., FRAP, FLIP, FLAP, etc.

Not only do the above-described optical arrangements for photomanipulation make it possible to dispense with arrangements for using multiphoton effects, which is less time-consuming and cheaper, but it is also possible to examine smaller sample volumes than when using multiphoton techniques.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numbers

| | |
|---|---|
| 1 | sample |
| 2 | sample holder |
| 3 | illumination light source |
| 4, 5 | lenses |
| 6 | CCD camera |
| 7 | imaging objective |
| 8 | control unit |
| 9 | evaluating unit |
| 10 | first manipulation light source |
| 11 | lens |
| 12 | deflection mirror |
| 13 | input-coupling element |
| 14 | diaphragm |
| 15 | slit diaphragm |
| 16 | second manipulation light source |
| 17 | beamsplitter |

The invention claimed is:

1. An optical apparatus for photomanipulation of a sample comprising:
   a sample holder for receiving the sample;
   an illumination device comprising:
      an illumination light source; and an illumination beam path for illuminating the sample with a light sheet;
a detection device for detecting light that is radiated from the sample;
imaging optics which image the sample at least partially on the detection device by means of an imaging objective in an imaging beam path,
wherein the light sheet is substantially planar in the focus of the imaging objective, and
wherein the imaging objective has an optical axis which intersects the plane of the light sheet at an angle different from zero;
a control unit;
means for photomanipulation of the sample,
wherein the illumination light source at the same time is a first manipulation light source and forms a first means for photomanipulation, and
wherein as a second means for photomanipulation, a second manipulation light source is provided, and light from the second manipulation light source is coupled into the imaging beam path via manipulation optics and deflected to the sample by the imaging objective.

2. The Optical Apparatus according to claim 1, wherein the first or second manipulation light source is constructed as a laser light source comprising at least one laser.

3. The Optical Apparatus according to claim 1, wherein the first manipulation light source and second manipulation light source emit light of different wavelengths or wavelength ranges.

4. The Optical Apparatus according to claim 1, wherein the first manipulation light source and second manipulation light source are identical.

5. The Optical Apparatus according to claim 1, wherein the second manipulation light source is constructed as a laser scanning microscope.

6. The Optical Apparatus according to claim 1, wherein the sample or sample holder is supported so as to be rotatable or displaceable.

7. The Optical Apparatus according to claim 1, wherein the control unit is designed to control first and second manipulation optics.

8. The Optical Apparatus according to claim 1, wherein it comprises an evaluating unit which converts the detected light into data and evaluates it.

9. The Optical Apparatus according to claim 8, wherein the control unit controls the movement of the sample or sample holder,
wherein the control is preferably carried out depending on the evaluation of the data.

10. The Optical Apparatus according to claim 1, wherein the first manipulation optics have means for structuring the light sheet.

11. The Optical Apparatus according to claim 10, wherein the means for structuring the light sheet comprise a slit diaphragm with one or more slits for spatial structuring.

12. The Optical Apparatus according to claim 10, wherein the means for structuring the light sheet comprise means for the temporal modulation of the light sheet.

13. The Optical Apparatus according to claim 10, wherein the means for structuring the light sheet comprise means for generating a plurality of overlapping light sheets.

14. A method for photomanipulation of a sample comprising the steps of:
receiving the sample;
illuminating the sample with a light sheet with an illumination device comprising:
an illumination light source;
detecting light that is radiated from the sample;
imaging the sample at least partially on the detection device by means of an imaging objective in an imaging beam path,
wherein the light sheet is substantially planar in the focus of the imaging objective, and
wherein the imaging objective has an optical axis which intersects the plane of the light sheet at an angle different from zero;
a step of photomanipulation of the sample,
wherein the step of photomanipulation comprise:
first manipulation by means of the illumination light source, and
second manipulation by means of a second manipulation light source, wherein light from the second manipulation light source is coupled into the imaging beam path via manipulation optics and deflected to the sample by the imaging objective, and
wherein the photomanipulation of samples is accomplished with one or more manipulation methods frap, ifrap, flip, flap, photoconversion, photoactivation, photoinactivation, microdissection, polymerization, ablation, melting, heating, and manipulation of excitation characteristics and emission characteristics of dyes.

15. The method according to claim 14, for spatially localized manipulation of a spatially extensive sample.

16. An optical apparatus for photomanipulation of a sample comprising:
a sample holder for receiving the sample;
an illumination device, the illumination device including:
an illumination light source; and
an illumination beam path for illuminating the sample with a light sheet;
a detection device for detecting light that is radiated from the sample;
imaging optics which image the sample at least partially on the detection device by means of an imaging objective in an imaging beam path, wherein the light sheet is substantially planar in the focus of the imaging objective, and the imaging objective has an optical axis which intersects the plane of the light sheet at an angle different from zero;
a control unit; and
means for photomanipulation of the sample,
wherein the means for photomanipulation include a manipulation light source and manipulation optics, and the manipulation optics includes an input-coupling element configured to supply at least one of the illumination beam path and the imaging beam path with light from the manipulation light source,
wherein the light supplied to the illumination beam path is shaped to form a substantially planar manipulation light sheet and illuminates the sample, and
wherein the light supplied to the imaging beam path is deflected to the sample via the imaging objective.

17. The Optical Apparatus according to claim 14, wherein the manipulation optics have means for structuring the light sheet, and
the means for structuring the light sheet comprise means for generating a plurality of overlapping light sheets.

* * * * *